US012599267B2

(12) United States Patent
Kim et al.

(10) Patent No.: US 12,599,267 B2
(45) Date of Patent: Apr. 14, 2026

(54) AIR CIRCULATING ROASTER

(71) Applicants: Hoon Kim, Daegu (KR); Chan Park, Federal Way, WA (US)

(72) Inventors: Hoon Kim, Daegu (KR); Chan Park, Federal Way, WA (US)

(73) Assignees: SAMKUM INDUSTRY CO. LTD, Daegu (KR); NANOTECH, Lynnwood, WA (US)

( * ) Notice: Subject to any disclaimer, the term of this patent is extended or adjusted under 35 U.S.C. 154(b) by 808 days.

(21) Appl. No.: 17/873,465

(22) Filed: Jul. 26, 2022

(65) Prior Publication Data

US 2024/0000265 A1     Jan. 4, 2024

(30) Foreign Application Priority Data

Jun. 30, 2022     (KR) ......................... 10-2022-0080560

(51) Int. Cl.
*A47J 37/07*          (2006.01)
(52) U.S. Cl.
CPC ....... *A47J 37/0754* (2013.01); *A47J 37/0786* (2013.01)
(58) Field of Classification Search
None
See application file for complete search history.

(56) References Cited

U.S. PATENT DOCUMENTS

| | | | |
|---|---|---|---|
| 9,668,612 B2 * | 6/2017 | Lee | A47J 27/04 |
| 2014/0373728 A1 * | 12/2014 | Lee | A47J 27/04 |
| | | | 99/349 |

FOREIGN PATENT DOCUMENTS

| | | | | |
|---|---|---|---|---|
| KR | 20000072768 A | * | 12/2000 | A47J 37/0786 |
| KR | 101114290 B1 | * | 2/2012 | A47J 37/06 |

OTHER PUBLICATIONS

Translation of KR-101114290-B1 (Year: 2012).*
Translation of KR-20000072768-A (Year: 2000).*

* cited by examiner

*Primary Examiner* — Elizabeth M Kerr
(74) *Attorney, Agent, or Firm* — PARK LAW FIRM

(57)          ABSTRACT

An air-circulating roaster has a cylindrical container having an open top and a body, a heating part for cooking, and a bottom container. The bottom container has an open-bottom and plural holes. The bottom container and an outer heat insulating container form an open-top insulation support beam. A lower ring is between the open-top insulation support beam and the body, an oil sump is formed at the top of the lower ring, and a table ring is provided on the top of the oil sump.

A roasting plate is on the upper side of the heating part, an oil outlet is formed on the upper side of the oil sump, and blowers suck air containing foreign substances. A combustion device has support beams to support the oil sump and a heating element, and a third air layer is formed between the open-top insulation support beam and the outer insulation part.

12 Claims, 15 Drawing Sheets

AIR CIRCULATING ROASTER

TECHNICAL FIELD TO WHICH INVENTION PERTAINS

The operation principle of the present invention is, allow air containing foreign substances (moisture, oil, smoke) generated by cooking the meat to circulate inside the roaster, to dry the moisture in the air by using a heat dissipation means (120), which transfers the heat generated by the heating part to the air containing foreign substances, so that reduces the contamination of the roaster by foreign substances, the present invention relates to air circulating roaster.

THE TECHNOLOGY BEHIND AN INVENTION

When cook meat using the heat of charcoal fire, moisture (beef juicy) and oil (fat) vaporizes and smoke spreads out. At this time, the tables or walls around roaster is smelly or soggy by contacting with water and oil of meat during cooking process.

Usually, restaurants which heating the meat on the table uses Korea Patent Publication No. 10-2000-0072768 "DEVICE FOR REMOVING SMELL AND SMOKE OF TABLE ROASTER", to use this roaster, restaurants should install a blower and provide an inlet separately at a certain distance from the roasting plate (grill) to get smoke (containing foreign substances such as moisture and oil).

By the way, this structure has the following problems:

This structure blocks the user's view by inlet is located on the roasting plate (grill), besides or may interfere with the movement to turn meat upside down.

Korea Patent No. 10-1114290 "Electric roaster" is disclosed as a prior art in which the above problems are improved.

The main feature of this technology is to install an inlet so as to surround the circumference of a roasting plate, so that inhales the air containing foreign substances generated by cooking the meat and allow air containing foreign substances to circulate inside the roaster's body, the outlet is also installed on the bottom of the roaster so that air circulates inside the body of roaster.

The roaster made using this technology has some problems such as contaminating the environment around the roaster or smell of cooking permeates the surroundings.

PRIOR ART DOCUMENTS

Patent Documents (Patent documents 01) Korea Patent Publication No. 10-2000-0072768 "DEVICE FOR REMOVING SMELL AND SMOKE OF TABLE ROASTER".
(Patent documents 02) Korea Patent No. 10-1114290 "Electric roaster".

DESCRIPTION OF THE INVENTION

Problem to be Solved of the Invention

The present invention has been made to more actively solve the problem described above. The present disclosure suggests the structure of the roaster which prevents air containing foreign substances (moisture, oil, smoke) generated by cooking the meat to spread around, so that prevents the contamination of environment surrounding the roaster due to the cooking the meat.

Means for Solving Problems

To solve the above problems, this air circulating roaster proposed in the present invention is configured with following forms.

This present invention relates to air circulating roaster, consists of the following form: The cylindrical container with an open top; The body (10) with a second penetration hole (11) formed through which the center part of the bottom surface is vertically penetrated; The heating part (20) for cooking the meat by using heat dissipated from the inner center of the above body (10); The bottom container (31) positioned on the top of the inner bottom in the above body (10) so as to support beam the heating part (20) from below, which has an open-bottom and forms a plural of third penetration holes (31a) at regular intervals on the outside; A open top-shaped heat insulation support beams (30) is positioned on the top of the above bottom container (31), outer heat insulating container (32) which accommodates some of heating part (20); Cylindrical lower ring with open upper and lower ring (41), which is inserted between the insulation support beams (30) and the body (10) so as to contact the inner bottom of body (10); The oil sump (42) provided on the top of the above lower ring (41); The table ring (43) provided on the top of the oil sump (42) with the first penetration holes (43a) formed at regular intervals on the outside; The outer insulation part (40) configured to be spaced apart from the vertically connected heating (20) and insulation support beams (30) by a certain distance in the outer direction; The roasting plate (50) placed on the upper side of the heating part (20), the oil outlet (51) is installed at regular intervals on the upper side of the above oil sump (42); The blowers (60) that draws air containing foreign substances (smoke, moisture, oil) generated by meat into the first air layer (R1) which positioned between outer heat insulation part (40) and the body (10) through the first penetration hole (43a); The bottom cap (70) with channel (71), which air containing foreign substances accumulated in the first air layer (R1) flows into second air layer (R2).

Besides, includes following forms: The drainage grooves (E) with a gap at regular intervals which is located between the upper side of the outer heat insulating container (32) and the oil sump (42); A plural of support beam (111) to support oil sump (42) is located under the drain groove; Burning device (110) made of carbon fiber (112).

The third air layer (R3) is formed between the heat insulation support beams (30) and the outer heat insulation part (40), moisture and oil generated by heating meat on a roasting plate (50) are mixed into the air, and it passes through the first penetration groove (43a), the first air layer (R1), the second air layer (R2), the second penetration hole (11), and the third penetration hole (31a), the third air layer (R3), drainage grooves (E) through oil outlet (51) and re-entrant into the first air layer (R1) and circulates, the moisture flowed into the third air layer (R3) is dried by heat generated from the heating part (20), some oil drops into the body (10), and some oil is burned by a combustion device (110), circulating along the inside of the body (10).

Besides, includes a heat dissipation means(120) consisting of a plural of heat plate (122) to dry moisture in the air by receiving heat generated from the heating part (20), circular band (121) wraps around the outside of the outer heat insulating container, on one side, above circular band (121) projects at regular intervals.

Besides, includes combustion device (110) with a plural of support beams (111) on the inside of the oil sump (42) under the drainage grooves (E) and combustion device (110) made of carbon fiber heating element fixed by above support beams (111).

Effects of the Invention

According to the present invention consisting of the above-described form, the moisture and oil generated from meat heated on a roasting plate (50) are mixed into air, and it passes through the first penetration groove (43a), the first air layer (R1), the second air layer (R2), the second penetration hole (11), and the third penetration hole (31a), the third air layer (R3), drainage grooves (E) through oil outlet (51) and re-entrant into the first air layer (R1) and then circulates; the moisture flowed into the third air layer (R3) is dried by heat emitted from the heating part (20), some oil drops into the body (10), and some oil is burned by a combustion device (110), along the air circulating inside of the body (10), so that can get the effect of preventing environmental contamination surrounding the roaster.

Besides,
the first insulation layer (T1) is formed of air between the inner container (22) and the outer container (23), the second insulation layer (T2) is formed of air between heating part (20) and inner heat insulating container (33), so that can get the effect to reduce overheating due to the heat transfer from the heating part (20) to the body (10).

Besides, the heat dissipation means(120) is installed on the outer surface of the outer insulating container (32), heat part (20), heat generated by the heating part (20) is more effectively transferred to air containing foreign substances into the third air layer (R3), so that can get effect to remove moisture from the air generated during the cooking process of meat.

Besides, the combustion unit (110) is equipped with under the drainage grooves (E), burns the oil in the air circulating inside of body (10), so that can get effect to reduce amount of oil that may be diffused to the outside through the air.

BRIEF DESCRIPTION OF DIAGRAMS

FIG. is a perspective view of an air circulating roaster configured with preferable embodiment of the present invention.

SPECIFIC DETAILS FOR IMPLEMENTING THE INVENTION

Figure 1:
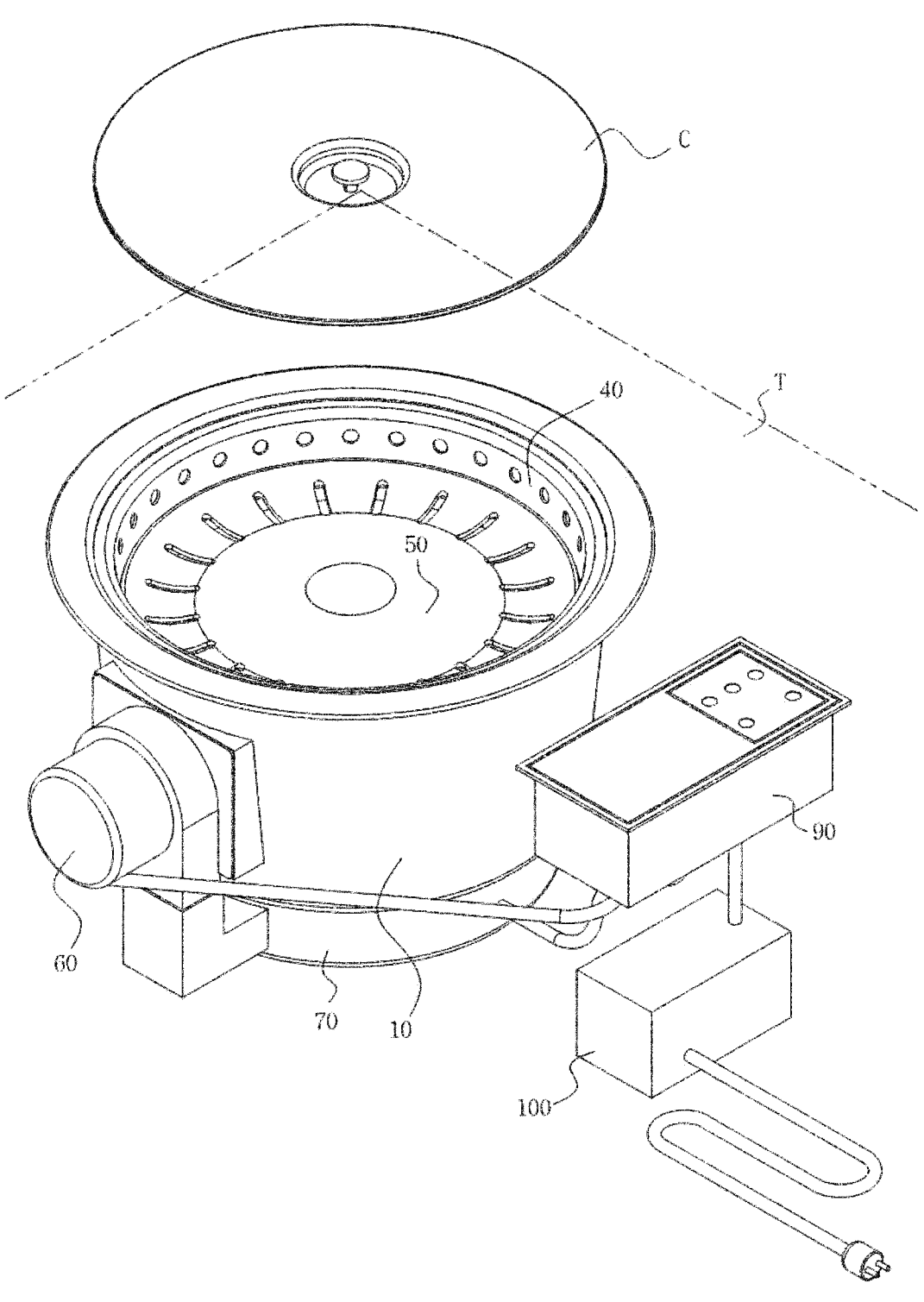
Figure 2:
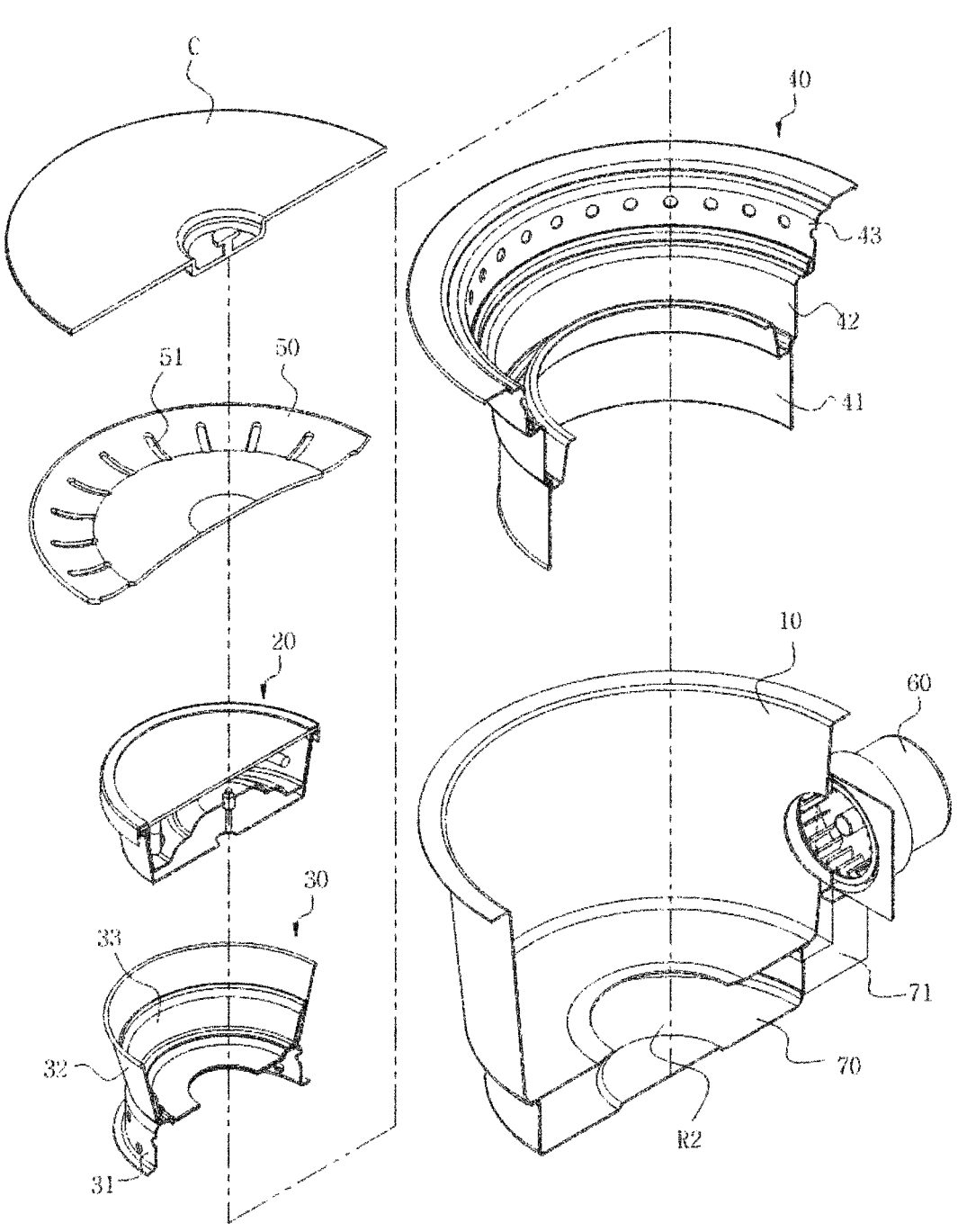
FIG. 2 is a perspective view of the components that bind to the inside and outside of the body (10).
Figure 3:
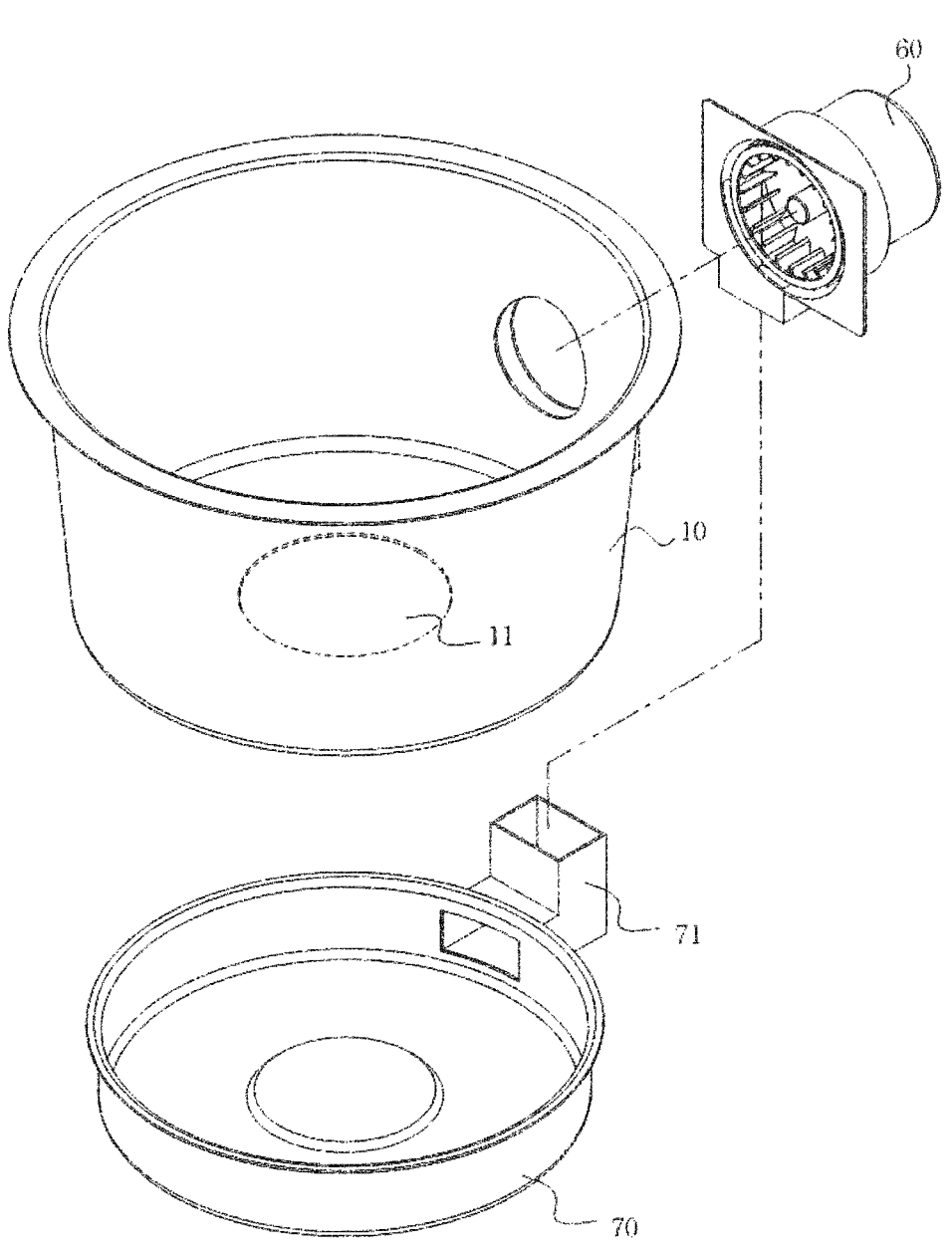
FIG. 3 is a perspective view of body (10), the blower (60) and the bottom cap (70).
Figure 4:
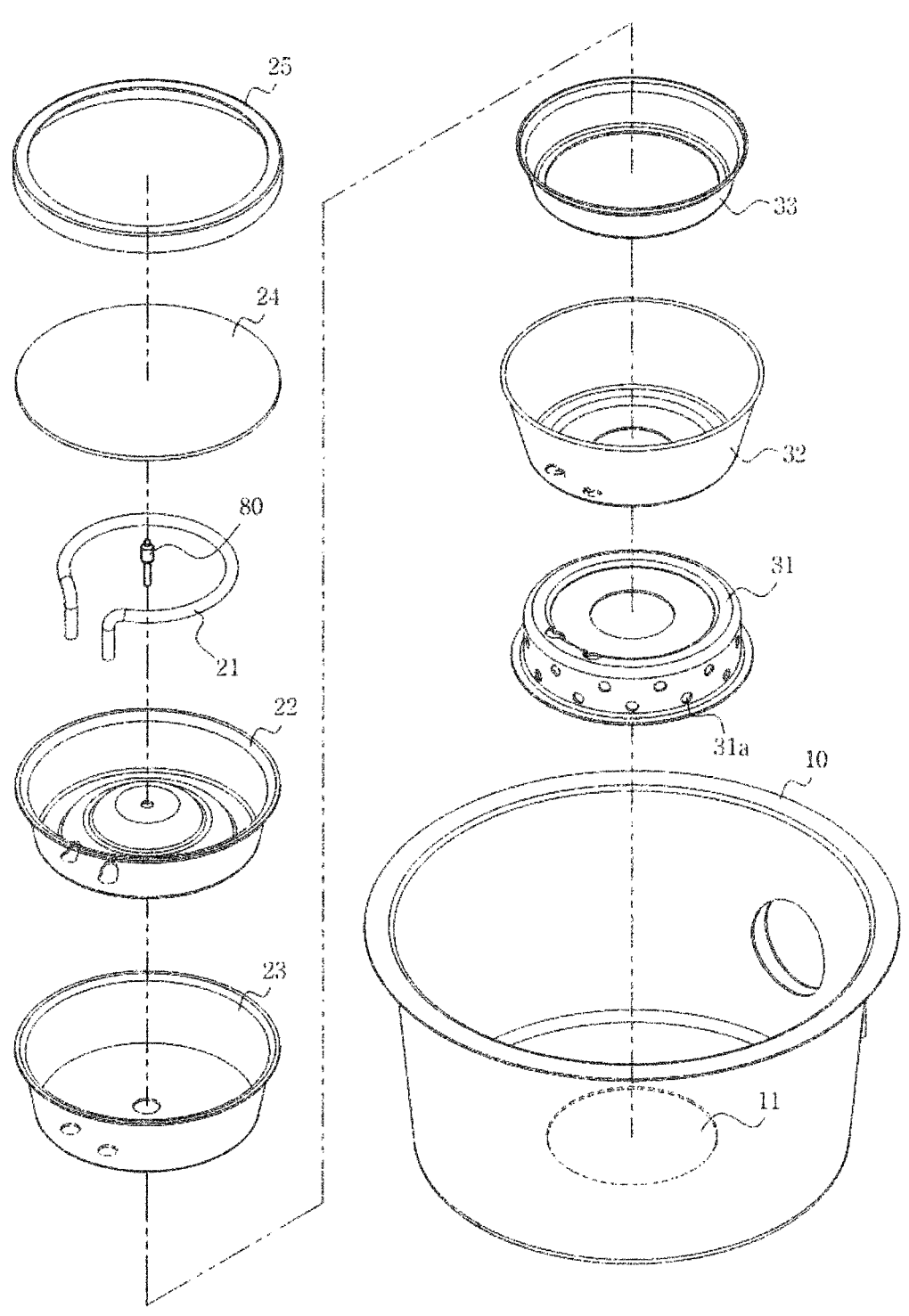
FIG. 4 is a perspective view of body (10), heating part (20) and the insulation support beams (30).
Figure 5:
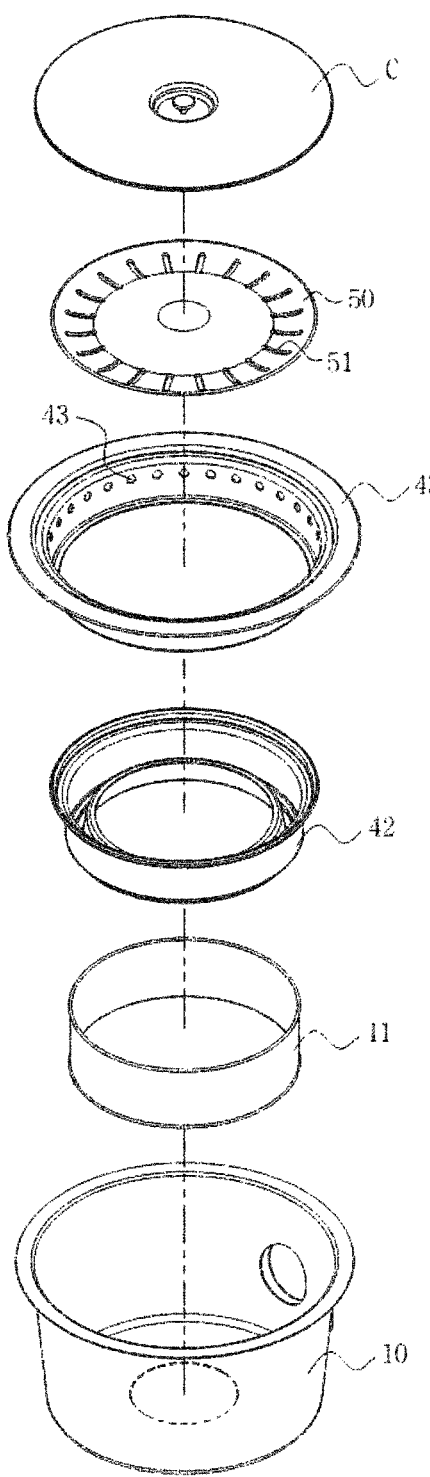
FIG. 5 is a perspective view of body (10) and outer insulation part (40).
Figure 6:
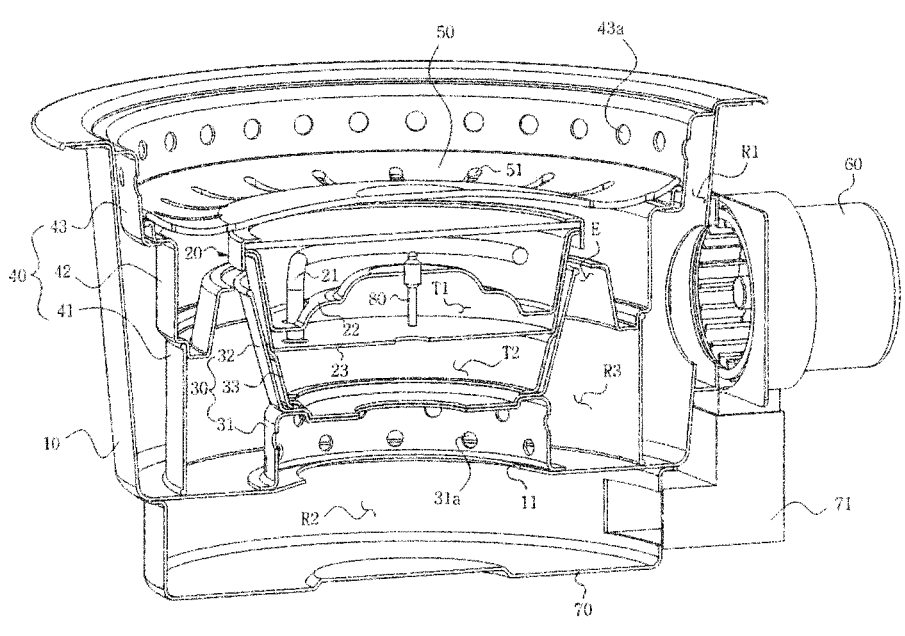
FIG. 6 is a cross-sectional view of inside of the body (10).
Figure 7:
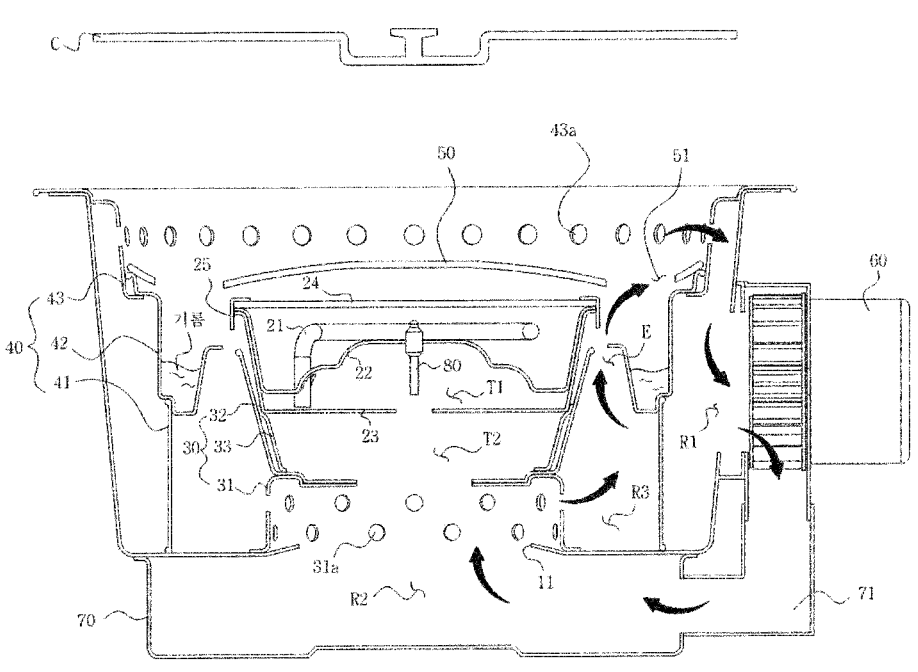
FIG. 7 is a Sectional view of the inside body (10).
Figure 8:
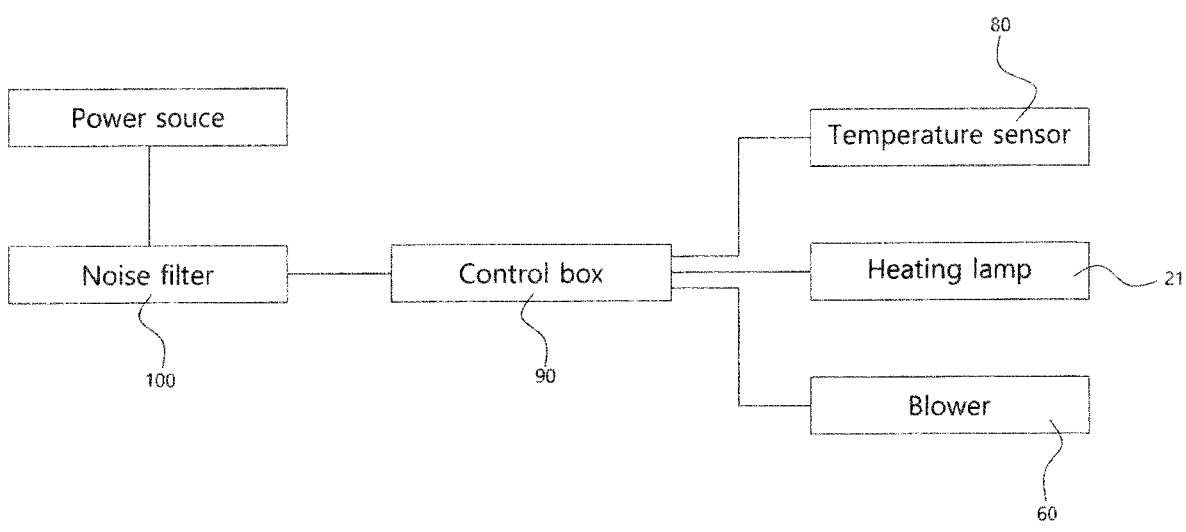
FIG. 8 is an electrical wiring diagram including the noise filter (100), control box (90) and a temperature sensor presented in the present invention.
Figure 9:
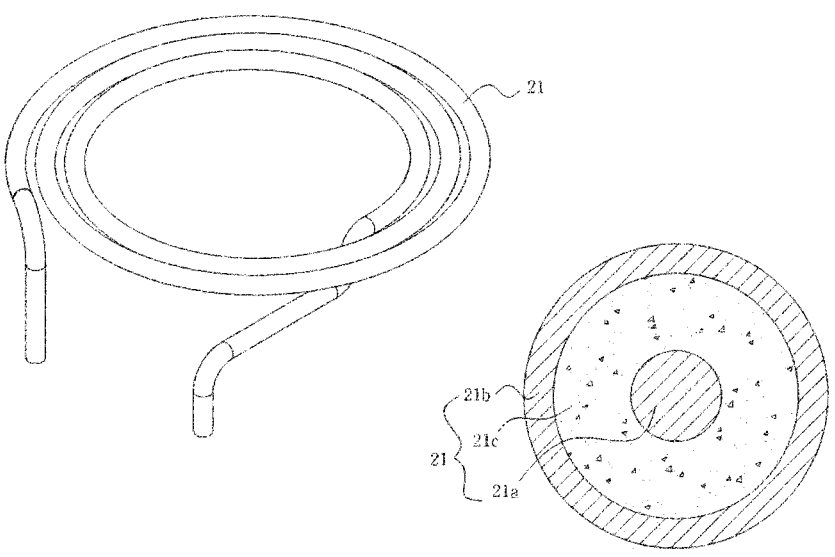
FIG. 9 is a perspective view and a cross-sectional view of the heating lamp (21) configured according to another embodiment of the present invention.
Figure 10:
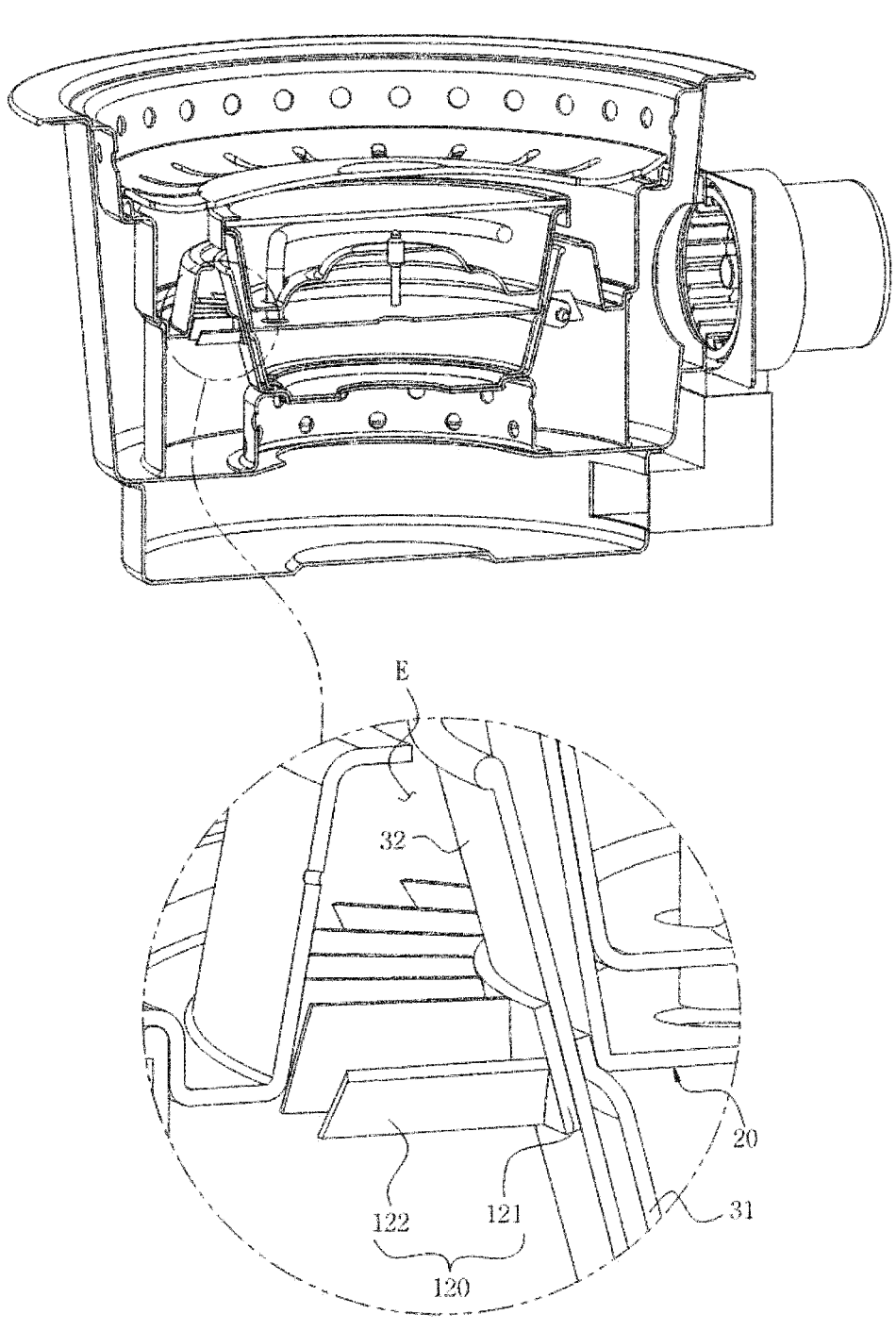
FIG. 10 is a perspective view of heat dissipation means (120) configured according to another embodiment of the present invention.
Figure 11:
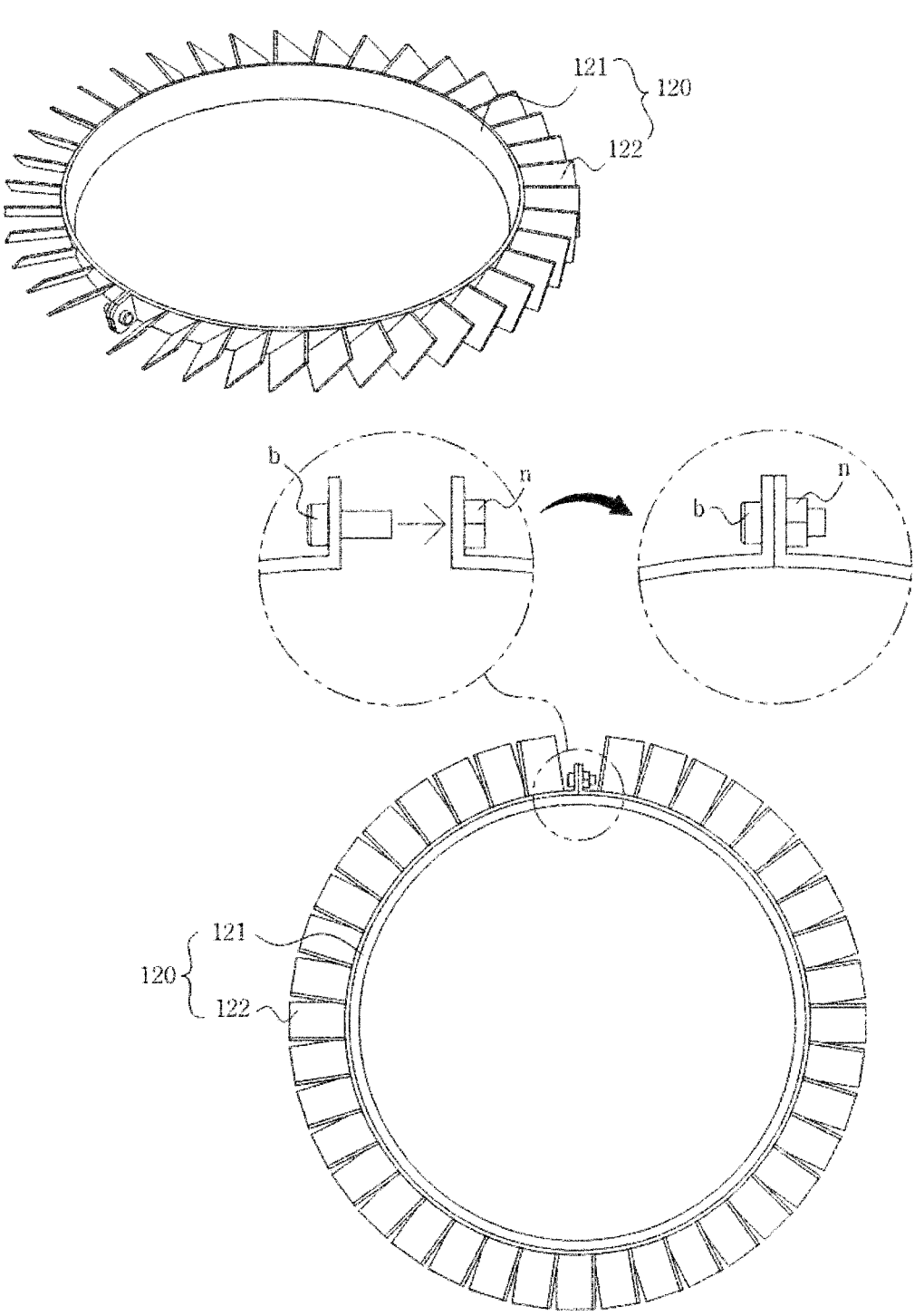
FIG. 11 is a perspective view and a plan view of means of the heat dissipation (120) configured according to an embodiment of FIG. 10.
Figure 12:
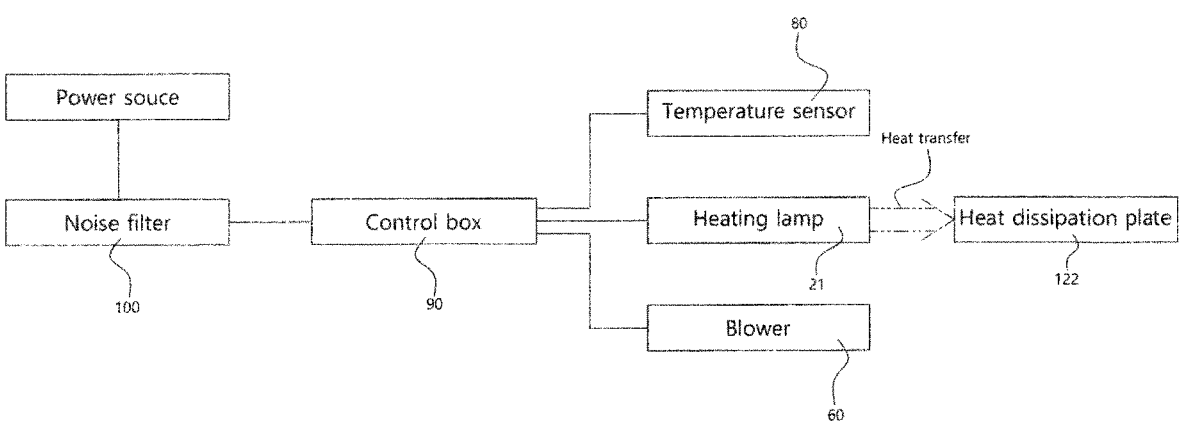
FIG. 12 is a configuration Diagram of an electrical wiring configured with a heat dissipation (122) according to an embodiment of the FIG. 10 and FIG. 11.
Figure 13:
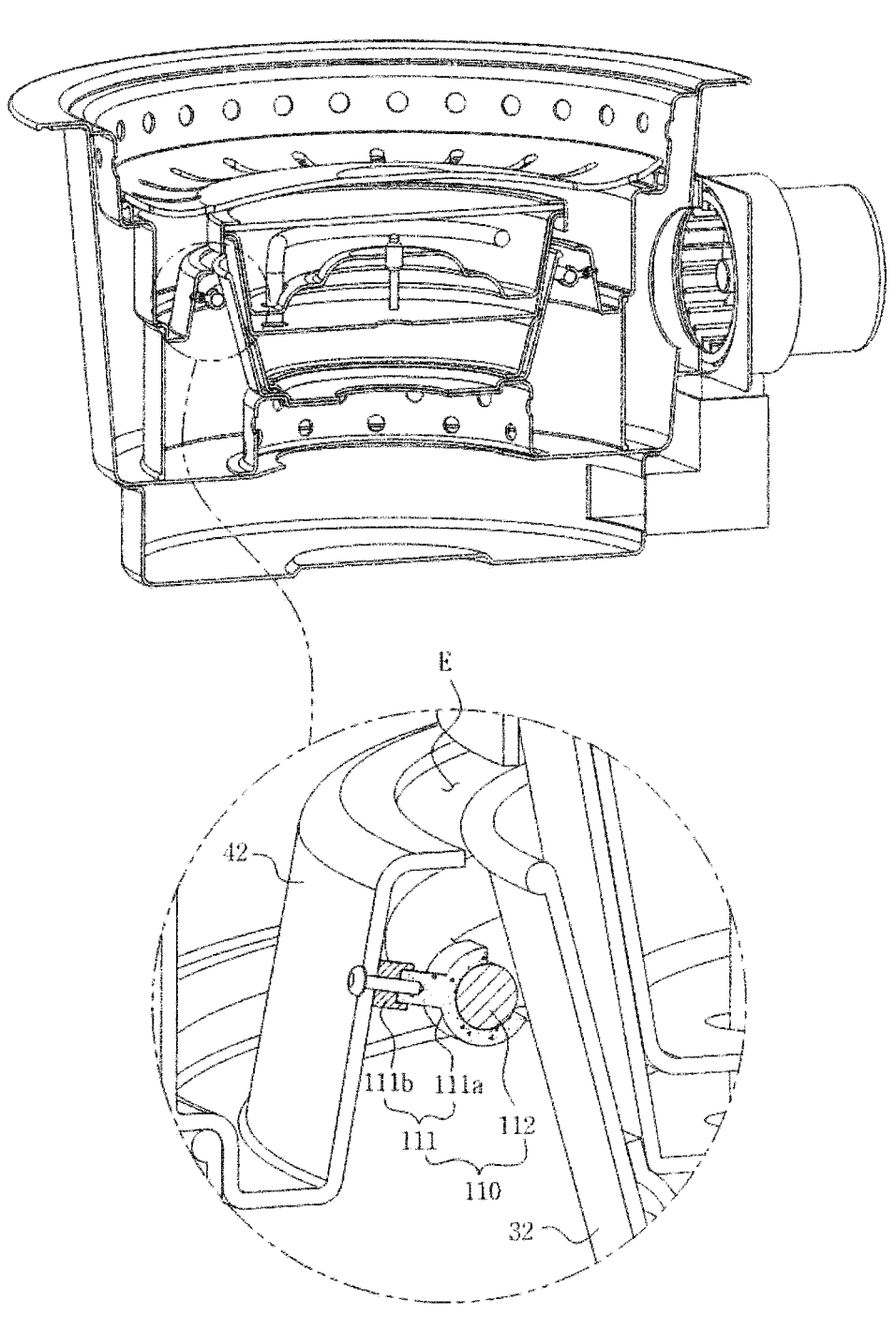
FIG. 13 is a perspective view in which the combustion device (110) configured according to another embodiment of the present invention.
Figure 14:
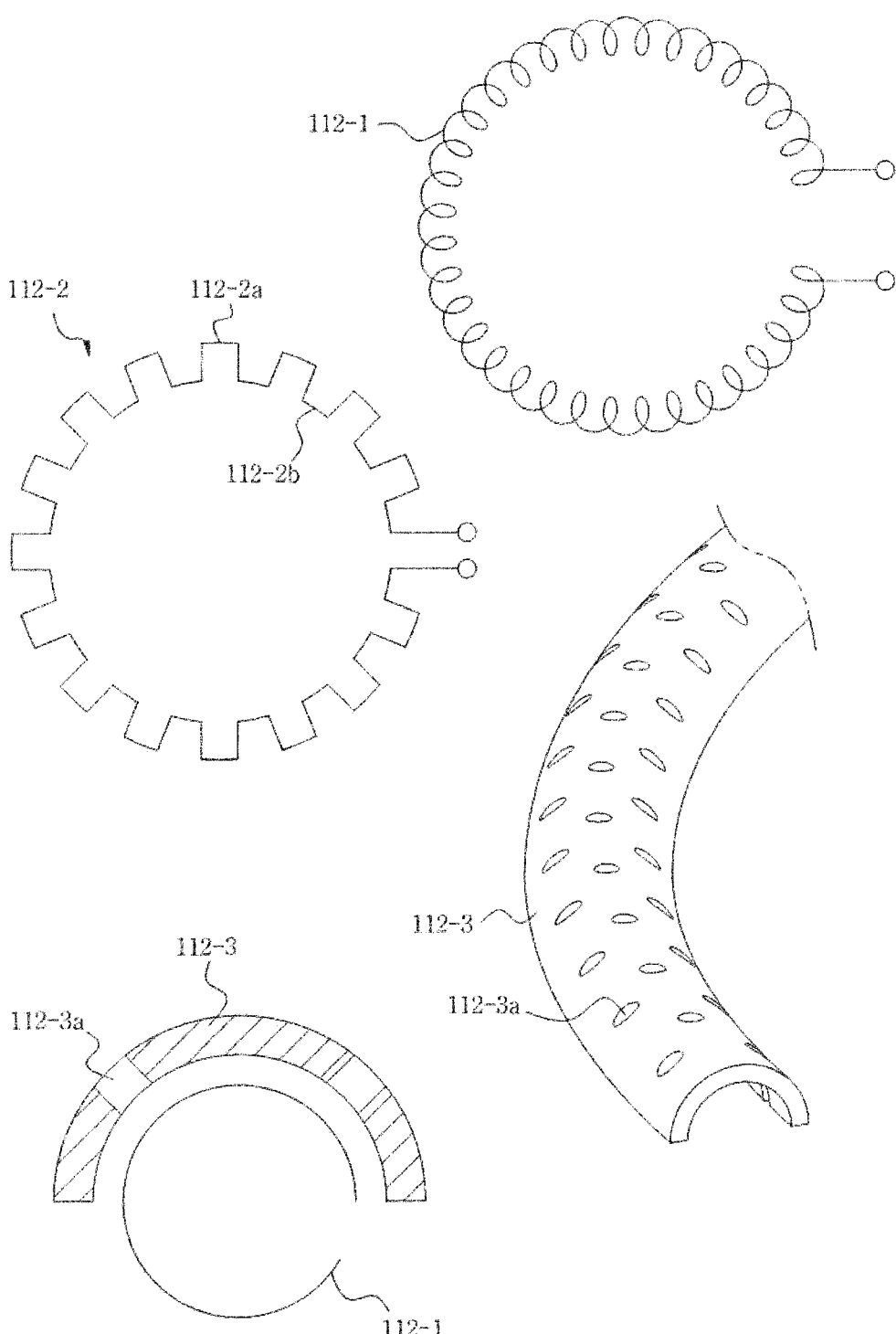
FIG. 14 is a Diagram illustrating four different embodiments of the heating element (112) configured according to the embodiment of FIG. 12.
Figure 15:
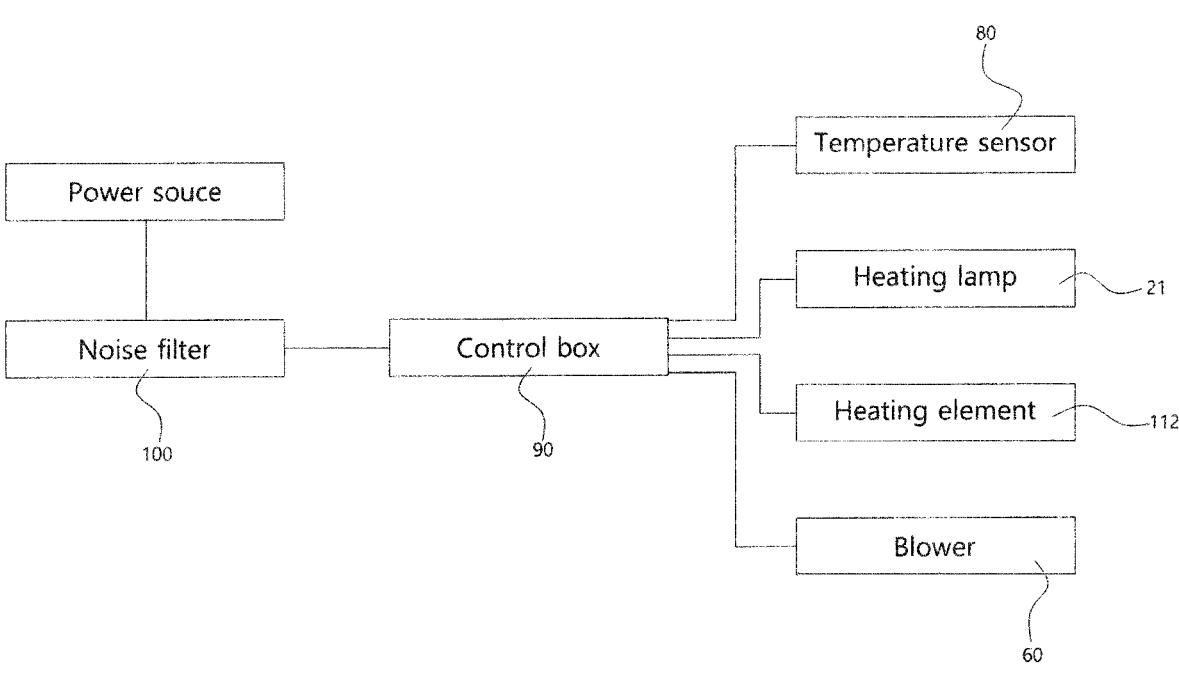
FIG. 15 is an electrical wiring configuration diagram in which the heating element 112 is provided according to an embodiment of FIG. 13 and FIG. 14.

The configuration of the present invention, its actions and effects will be collectively described with reference to the following accompanying Diagrams.

Advantages and features of the present invention and those methods to achieve them will be clarified with reference to the embodiments described below in detail with the accompanying diagrams. Provided that, the present invention is not limited to the embodiments disclosed below, but may be implemented in various different forms, the embodiment of present invention is merely intended to ensure the present disclosure is complete, we are going to provide to fully inform the scope of the invention to those skilled in the art to which the invention belongs, the present invention is only defined by the scope of the claims. And the same reference numerals refer to the same components throughout the specification.

The purpose of using the air circulating roaster of the present invention is to remove moisture and oil mixed in the air generated during cooking of meat, so that reduce the contamination of the air surrounding roaster, as shown in Diagram 1 to 8, includes body (10), heating part (20), insulation support beams (30), outer insulation (40), roasting plate (50), oit outlet (51), blower (60), bottom cap (70), temperature sensor (80), control box (90) and noise filter (100), burning device (110).

The body (10) is a cylindrical container with an open top, includes a roasting plate (50) which cook the meat on a roasting plate (50) by emitting heat to the center of the body (10), the specifics will be mentioned below.

Heating part (20) consists of heating lamp (21) that emits heat using electricity, open-topped inner container (22) which accommodates the heating lamp (21) and reflect light and heat generated from the heating lamp (21) upward, outer container (23) which accommodate the inner container (22).

The first insulating layer (T1) made of air is formed between the inner container (22) and the outer container (23), so that can reduce the heat generated by the heating lamp (21) from being transferred to the outer cylinder into the air.

And heating part (20) contains a glass diffusion plate (24) to be installed on the top of the inner container (22), which prevent light from the heating lamp (21) to exposed to the outside and also prevent the contamination of top of the inner container (22) from by oil generated during cooking.

As described above, a glass diffusion plate (24) fixed on top of inner container (22) is fixed by a reinforcing ring (25) surrounding the glass diffusion plate (24) and the edge of the inner container (22).

Heat insulation support beams (30) is located on the top of inner bottom of the body (10) and is configured to support the heating part (20) from below, prevents the body (10) from overheating due to heat generated from the heating part (20) by keeping a distance between the heating part (20) and the body (10).

The composition of heat insulation support beam (30) are as following bottom container (31) with open bottom and a plural of third penetration holes (31a) formed at regular intervals on the side; the outer heat insulating container (32) which positioned on the top of the above bottom container (31), which has a open top and accommodate some of above heating part (20); Inner heat insulating container (33) which is accommodate into outer heat insulating container (32) and those top supports the heating part (20).

The second insulating layer (T2) made of air is formed between the heating part (20) and the inner heat insulating container (33), so that can reduces to transfer the heat generated by the heating part (20) to the body (10).

The outer insulation part (40) is configured to be spaced apart from the vertically connected heating (20) and insulation support beams (30) by a certain distance in the outer direction; the first air layer (R1) is formed between outer insulation (40) and the body (10), so that can reduce heat to transfer to the side.

The outer insulation part (40) consists of bottom ring (41), oil sump (42) and table ring (43).

The bottom ring (41) is cylindrical with open upper and lower, is configured to be inserted between the insulation support beams (30) and the body (10), and to be contacted with the bottom of inside the body (10). And oil sump (42) is installed on the bottom ring (41), oil sump so as to receive oil came out of meat on a roasting plate (50), the specifics will be mentioned below.

The table ring (43) is configured on the top of the oil sump (42), the first penetration hole (43a) is formed at regular intervals on the outer, air mixed with oil and moisture (meat juice) generated from meat roasted on one side of roasting plate (50) through the first penetration hole (43a) flowed into the first air layer (43a) by using blower, the specifics will be mentioned below.

The roasting plate (50) is located on the top of heating part (20), in first the meat on the roasting plate (50) is cooked by receiving heat generated from the heating part (20). The oil outlets (51) are formed at regular intervals on the upper side of roasting plate with oil sump (42), allow the liquid oil generated from the roasting plate (50) to flow into oil sump (42) through oil outlet (51).

The blower (60) is provided in the one side of body (10), which allows air containing foreign substances (smoke, moisture, oil) to flow into the first air layer (R1) through the first penetration hole (43a).

The bottom cap (70) with open top, second air layer (R2) is formed inside, the channel (71) is installed for air containing foreign substances accumulated in the first air layer (R1) flow into the second air layer (R2) by a blower (60).

The second penetration hole (11) with a partially vertical penetration of the center of the bottom surface is formed in the body (10).

As described above, the air containing foreign substances flows into the second air layer (R2) passes through the second penetration hole (11), through the inside of the bottom container (31), and into the third penetration hole (31a).

As described above, the air containing foreign substances passed through the third penetration hole (31a) flows into the third air layer (R3) which is formed between heat insulation support beam (30) and outer heat insulation part (40), moisture flowed into the third air layer (R3) is dried by heat emitted from the heating part (20), some oil drops into the body (10), and some oil is burned by a combustion device (110), along the air circulating inside of the body (10).

As described above, as smoke moves through the first air layer to third air layer (R3), smoke is diluted by air formed inside of the first air layer to third air layer (R3).

The drainage grooves (E) with a gap is formed between the upper of the outer insulating container (32) and the oil sump (42) at regular intervals, the air which removed some of the moisture and oil in the third air layer (R3) escapes upward.

The air escaping from the drainage grooves (E) comes out through the oil outlet (51), some of the air escaping through the oil outlet (51) escapes out of the body (10), the some of air is flowed into the first penetration hole (43a) by the blower (60), passes through the first penetration groove (43a), the first air layer (R1), the second air layer (R2), the second penetration hole (11), and the third penetration hole (31a), the third air layer (R3), drainage grooves (E) through oil outlet (51) and re-entrant into the first air layer (R1) and circulates, so that the process to remove the foreign substances (moisture and oil mixed in smoke and air) which generated during cooking of meat is continuously repeated.

As shown diagram 1, the air circulating roaster of the present invention may be installed to be buried in the table (T) of the restaurant, allow foreign substances in the air generated during the processing of meat to circulate inside of body (10) so as to remove the foreign substances to a certain extent, so that it is possible to reduce the soggy or contamination of the air surrounding the roaster by the moisture or oil.

The above heating lamp (21) consists of heating wire (21a) which converts electricity into thermal energy, exterior material (21b) which is spaced apart from a heating wire (21a) and the filler (21c) which is injected into the above exterior materials (21b).

The heating lamp (21) mentioned in the present invention is a halogen lamp, heating wire (21a) is made of carbon fiber, exterior materials (21b) is made of a transparent quartz tube, filler (21c) may be composed of a mixture of an inert gas and a halogen gas (I+Br+Cl).

The halogen lamp emits near-infrared rays, near-infrared rays have excellent permeability to meat, so that the outside and inside of meat can be cooked evenly.

As a different embodiment from the above, heating lamp (21) may be composed of tubular heater. In this case, the heating wire (21a) is made of a chromium aluminum alloy (OCr25AL5), exterior materials (21b) may be made of stainless alloy (SUS304), the filler (21c) may be made of magnesium oxide (MgO) with excellent thermal conductivity and electrical insulation at high temperatures.

In case of that heating lamp (21) is made of tube heater, so that it is easy to banding process because exterior materials (21b) is made of a flexible stainless alloy, as shown in Diagram 9, if manufactured in a helical shape, the cooking time of meat can be shortened as increasing the surface area of the heating lamp (21) which emits the heat.

Cover (C) may be installed on the top of table ring (43), the heat doesn't escape upward as long as just put the cover (C) on the top of the table ring (43) during cooking the meat, cooking time can be shorten.

To keep the meat from burning, the user must be able to easily control the temperature, so need the temperature sensor (80), the control box (90), and the noise filter (100) so as to control the temperature value within the margin of error.

The temperature sensor (80) is installed into inside of heating part (20), the heating part (20) senses internal temperature, and transmits to the control box (90) provided outside the body (10).

The control box (90) has an operation button to set the temperature of the heating lamp (21), supplies power to the temperature sensor (80), blower (60) and halogen lamp.

If the temperature value of the heating part (20) measured by the temperature sensor (80) is higher than the temperature set by the user, Lower the temperature by lowering the amount of current supplied from the control box to the heating lamp (21), if on the contrary to this the temperature value of the heating part (20) measured by the temperature sensor (80) is lower than the temperature set by the user, raise the temperature by increasing the amount of current supplied from the control box to the heating lamp (21), as raise the temperature, the temperature of the heating part (20) can be kept within an error range of the temperature value set by the user.

In case of that electricity supplied to the temperature sensor (80) generates noise, if an error occurs in the measured value, it is difficult to maintain the setting temperature in the heating unit (20). As a means of preventing this, install a noise filter (100) that receives current from a power source and supplies electricity with a purified constant waveform to the control box (90).

In the present invention, as described above, allow air containing foreign substances generated by cooking the meat to circulate inside the body (10), the moisture is dried using the heat generated by the heater part (20).

In another embodiment, as shown in Diagram 10 to 12, a heat dissipation means(120) is configured on the outer surface of the outer heat insulating container (32) so that heat generated by the heating unit (20) may be more effectively transferred to the air containing foreign substances.

The heat dissipation means(120) consists of a circular band surrounding the outer surface of the outer insulating container (32) and a plurality of heat dissipation plate (122), heat dissipation plate which allows circular band (121) to protrude from one surface at regular intervals.

The circular band (121) allows both ends to be disassembled and assembled by combining bolt and nut, in first surround the outer surface of the outer insulating container (32) and then tighten the bolt (b) and nut (n) so that the circular band is fixed to the outer insulating container (32).

The heat generated from the heating unit (20) is transferred to the heat dissipation means (120) through the inner heat insulating container, the heat dissipation plate (122) increases a contact area with air containing foreign substances so as to increase amount of heat transfer to the air.

The heat dissipation plate (122) is inclined at a set angle with respect to the top and bottom of the circular band (121), because as the air in the third air layer (R3) rises, the contact time and area with the heat dissipation plate (122) increases.

According to this, the moisture in the air can be dried more effectively, so that smell of meat from spreading out of the body (10) can be reduced.

As described above, in the present invention the some of the oil generated by cooking the meat is mixed into the air and circulates inside of body (10), some oil drops into the body (10), and some oil is burned by a combustion device (110), along the air circulating inside of the body (10).

In another embodiment, the combustion device (110) is configured under the drainage grooves (E) as shown in Diagram 13 to 15 so as to burn oil in the air circulating inside the body (10), besides, it is possible to further reduce the amount of oil diffused to the outside through the air.

The combustion device (110) consists of a plurality of support beams (111) configured on the inner surface of the oil sump (42) under the drainage grooves (E) and heating element (112) fixed by the above support beams (111).

The heating element (112) is made of carbon fiber, receives electricity from the control box (90) and emits the heat by its own resistance, so that moisture in the air is dried up and oil is burned.

For the above support beam (111), ceramic is used in the portion (112a) holding the heating element (112), the portion (112b) in contacted with oil sump (42) is made of heat insulation material, so as not to overheat the oil sump (42).

In the present invention, the shape of the heating element (112) is presented in four embodiments as shown in Diagram 14, one case of four embodiments is that helical coil-shaped heating element (112-1) may be formed under the drainage grooves (E) in a circular shape.

According to this, the moisture and oil contained in the air of the third air layer (R3) pass through the gap of the helical coil-shaped heating elements (112-1), receives the heat from the heating element (112-1) made of carbon fiber so as to be dried and burned.

And one of the above other forms of the heating element (112-2) is formed in a circular shape under the drainage grooves (E), provided that, another heating elements is a gear-shaped which may be formed by crossing the exposed portion (112-2a) and buried portion (112-2b) in the plane direction.

Exposed portion (112-2a) and buried portion (112-2b) are structured to increase the area in contact with air, when the air in the third air layer (R3) rises, the heat is transferred as it passes through a gap between the exposed portion (112-2a) and the buried portion (112-2b), so that the moisture and oil is dried and burned.

As an embodiment of the heating element (112-3) different from the above, the heating element (112-3) is made in a circle under the drainage grooves (E), but may cross-section is a semicircular-shaped tube with a convex upward, a plurality of ventilation holes (112-3a) may be formed on the surface thereof.

The structure of the above semicircular-shaped tube become narrower as going upward, the foreign substances in the air do not deviate in the direction of the heating element (112-3), semicircular-shaped tube has a structure that is collected to the upward, so as to increase the drying and combustion efficiency of moisture and oil, while as the air which removed foreign substances under the heating element (112-3) passes upward through the ventilation hole (112-3a).

As a final embodiment of another heating element (112), cross-section has a semicircular-shaped tube with a convex upward, may be combined following heating elements; the heating element (112-3) with a plural of ventilation holes formed on the surface and the circular heating element (112-1) in the form of a helical coil under a semicircular tube-shaped heating element (112-3).

According to this, moisture and oil passes through semi-circular which have helical coil-shaped and tubular-shaped heating elements (112-1, 112-3) sequentially so that able to dry and burn moisture and oil more effectively.

An embodiment of the present invention described above is just to explain the present disclosure by referring to the diagrams, if person with ordinary skill in the art to which the inventions pertain, from this it should be clarified that various modifications and equivalent embodiments are possible. Therefore, true scope of technical protection of this invention shall be interpreted by the appended claims, all technical ideas within the equivalent scope should be interpreted as being included in the scope of this invention.

[Explanation of the lettering on the plan]

| | |
|---|---|
| Body (10) | Second penetration hole (11) |
| Heating part (20) | Heating lamp (21) |
| Heating wire (21a) | Exterior materials (21b) |
| Filler (21c) | |
| Inner container (22) | Outer container (23) |
| Glass diffusion plate (24) | Reinforcement ring (25) |
| Heat insulation support beams (30) | |
| Bottom container (31) | Third penetration hole (31a) |
| Outer heat insulating container (32) | Inner heat insulating container (33) |
| Outer heat insulation part (40) | Bottom ring (41) |
| Oil sump (42) | |
| Table ring (43) | First penetration hole (43a) |
| Roasting plate (50) | Oil outlet (51) |
| Blower (60) | |
| Bottom cap (70) | Channel (71) |
| First insulation layer (T1) | Second insulation layer (T2) |
| First layer of air (R1) | Second layer of air (R2) |
| Third layer of air (R3) | Drainage grooves (E) |
| Temperature sensor (80) | Control box (90) |
| Noise filter (100) | |
| Combution device (110) | Support beam beam (111) |
| Heating element (112) | |
| Heating dissipation means (120) | Circular band (121) |
| Heat dissipation plate (122) | |

The invention claimed is:

1. An air-circulating roaster, comprising:
a cylindrical container comprising an open top and a body, wherein the body comprises a bottom surface with a second penetration hole through a center of the bottom surface;
a heating part for cooking meat by dissipating heat from an inner center of the body;
a bottom container positioned on the top of an inner bottom of the body so as to support the heating part from below;
wherein the bottom container comprises an open-bottom and a plurality of third penetration holes formed at regular intervals and positioned on the top of the bottom container;
wherein the bottom container and an outer heat insulating container form an open-top insulation support beam that accommodates a part of the heating part;
a lower ring inserted between the open-top insulation support beam and the body so as to contact the inner bottom of the body;
an oil sump formed at the top of the lower ring;
a table ring provided on the top of the oil sump, wherein the table ring comprises first penetration holes formed at regular intervals;
wherein the lower ring and the table ring form an outer insulation part spaced apart from the heating part and the open-top insulation support beam in the outer direction;

a roasting plate positioned on an upper side of the heating part, wherein the roasting plate is configured to accommodate meat on the top of roasting plate, wherein the meat is cooked by heat from the heating part;
an oil outlet formed at regular intervals on the upper side of the oil sump;
blowers configured to suck air containing foreign substances comprising smoke, moisture, or oil generated from the meat being cooking on the roasting plate of the body through the first penetration holes, wherein the air is sent into a first air layer formed between the outer insulation part and the body;
a bottom cap comprising: an open top and a second air layer formed inside, wherein the bottom cap comprises a sidewall with a channel to drain the air containing foreign substances accumulated in the first air layer into the second air layer by the blower;
a drainage groove comprising a gap between the outer heat insulating container and the oil sump;
a combustion device comprising:
a plurality of support beams configured to support the oil sump and located under the drainage groove; and
a heating element made of carbon fiber;
a third air layer formed between the open-top insulation support beam and the outer insulation part;
wherein the air containing foreign substances passes consecutively through the first penetration holes, the first air layer, the second air layer, the second penetration hole, the third penetration holes, the third air layer, the drainage groove, and the oil outlet, wherein the air containing foreign substances reenters the first air layer and circulates;
wherein the heating part is configured to dry moisture in the air containing foreign substances in the third air layer,
wherein a portion of the oil drops into the body and another portion of the oil is burned by the combustion device.

2. The air-circulating roaster of claim 1 wherein the heating part has a heating wire converting electricity into thermal energy, an exterior material is wrapping a heating lamp at a certain distance from the heating wire, and a filler is injected into an inside of the exterior material, and wherein the air-circulating roaster further comprises a first insulating layer formed between an inner container and an outer container.

3. The air-circulating roaster of claim 2 wherein the heating lamp is a halogen lamp, wherein the heating wire is made of carbon fiber, wherein the exterior material is made of a transparent quartz tube, and wherein the filler is composed of a mixture of an inert gas and a halogen gas.

4. The air-circulating roaster of claim 2 wherein the heating wire is made of a chromium aluminum alloy, wherein the exterior material is made of stainless alloy, and wherein the filler is made of magnesium oxide.

5. The air-circulating roaster of claim 2 wherein a temperature sensor is installed in the heating part and detects the temperature inside the heating part, and the air-circulating roaster further comprises a control box comprising an operation button to control the temperature of the heating lamp, and a noise filter which receives current from a power source and supplies electricity to the control box.

6. The air-circulating roaster of claim 1 further comprising an inner heat insulating container accommodated in the outer heat insulating container supporting the heating part, and a second insulating layer filled with air is formed between the heating part and the inner heat insulating container.

7. The air-circulating roaster of claim 1 further comprising a circular band surrounding the outer side of the outer heat insulating container, and a plurality of heat dissipation plates formed protruding from one side of the circular band.

8. The air-circulating roaster of claim 7 wherein at least one of the heat dissipation plates is inclined at a set angle with respect to the top and bottom of the circular band.

9. The air-circulating roaster of claim 7 wherein the circular band comprises two ends, wherein the two ends are connected with a nut and a bolt, and the circular band surrounds the outer surface of the outer heat insulating container.

10. The air-circulating roaster of claim 1 wherein the plurality of support beams of the combustion device are configured on the inner surface of the oil sump under the drainage groove, and the heating element is fixed by the support beam.

11. The air-circulating roaster of claim 10 wherein the plurality of support beams use a ceramic on a portion holding the heating element the plurality of support beams use a heat insulation material to insulate the oil sump.

12. The air-circulating roaster of claim 10 wherein the heating element is configured under the drainage groove in a circular shape, and a plurality of ventilation holes are formed on the surface of the heating element.

\*   \*   \*   \*   \*